(12) United States Patent
Jarvis et al.

(10) Patent No.: US 9,672,346 B2
(45) Date of Patent: Jun. 6, 2017

(54) OBJECT TRACKING BY ESTABLISHING A MESH NETWORK AND TRANSMITTING PACKETS

(71) Applicant: Qualcomm Technologies International, Ltd., Cambridge (GB)

(72) Inventors: Murray Robert Jarvis, Cambridge (GB); Robin Heydon, Cottenham (GB); Nicholas John Jones, Cambridge (GB); Nicolas Guy Albert Graube, Barrington (GB); David Huntingford, Scottsdale, AZ (US); Reuven Meyer Samuel, San Jose, CA (US)

(73) Assignee: QUALCOMM Technologies International, LTD., Cambridge (GB)

( * ) Notice: Subject to any disclaimer, the term of this patent is extended or adjusted under 35 U.S.C. 154(b) by 0 days.

(21) Appl. No.: 14/505,458

(22) Filed: Oct. 2, 2014

(65) Prior Publication Data
US 2015/0245179 A1    Aug. 27, 2015

(30) Foreign Application Priority Data

| Feb. 25, 2014 | (GB) | 1403312.0 |
| Feb. 25, 2014 | (GB) | 1403314.6 |
| Mar. 31, 2014 | (GB) | 1405785.5 |
| Mar. 31, 2014 | (GB) | 1405786.3 |
| Mar. 31, 2014 | (GB) | 1405789.7 |
| Mar. 31, 2014 | (GB) | 1405790.5 |
| Mar. 31, 2014 | (GB) | 1405791.3 |

(Continued)

(51) Int. Cl.
*H04W 4/02* (2009.01)
*G06F 21/44* (2013.01)
(Continued)

(52) U.S. Cl.
CPC ......... *G06F 21/44* (2013.01); *G06Q 10/0833* (2013.01); *H04B 7/14* (2013.01);
(Continued)

(58) Field of Classification Search
CPC ..... H04W 16/18; H04W 52/38; H04W 4/008; H04W 24/06; H04W 72/12
(Continued)

(56) References Cited

U.S. PATENT DOCUMENTS 6,917,974 B1    7/2005    Stytz et al.
6,986,046 B1    1/2006    Tuvell et al.
(Continued)

FOREIGN PATENT DOCUMENTS

CN    102761941 A    10/2012
CN    102984798 A    3/2013
(Continued)

OTHER PUBLICATIONS

Search Report for DE Application 10 2014 012 258.1 mailed on Mar. 2, 2015 (12 pages).
(Continued)

*Primary Examiner* — Sam Bhattacharya
(74) *Attorney, Agent, or Firm* — Paradice and Li LLP (57) ABSTRACT

A communication device configured to form a cluster with one or more other communication devices in its vicinity, monitor the presence, in the cluster, of those other communication devices and provide information about the presence, in the cluster, of the other communication devices to another device.

19 Claims, 7 Drawing Sheets

(30) Foreign Application Priority Data

Mar. 31, 2014 (GB) .................................. 1405797.0
Jul. 17, 2014 (GB) .................................. 1412717.9

(51) Int. Cl.

| | | |
|---|---|---|
| H04L 12/26 | (2006.01) | |
| H04W 40/24 | (2009.01) | |
| H04W 84/18 | (2009.01) | |
| H04L 12/751 | (2013.01) | |
| H04L 12/24 | (2006.01) | |
| H04L 9/08 | (2006.01) | |
| H04W 76/02 | (2009.01) | |
| H04B 7/14 | (2006.01) | |
| H04L 12/801 | (2013.01) | |
| H04L 12/933 | (2013.01) | |
| H04L 29/08 | (2006.01) | |
| G06Q 10/08 | (2012.01) | |
| H04L 5/00 | (2006.01) | |
| H04W 4/06 | (2009.01) | |
| H04L 29/06 | (2006.01) | |
| H04W 12/04 | (2009.01) | |
| H04W 12/06 | (2009.01) | |
| H04W 16/18 | (2009.01) | |
| H04W 52/38 | (2009.01) | |
| H04W 4/00 | (2009.01) | |
| H04W 24/06 | (2009.01) | |
| H04W 52/02 | (2009.01) | |
| H04H 20/71 | (2008.01) | |
| H04W 72/12 | (2009.01) | |
| H04W 88/06 | (2009.01) | |

(52) U.S. Cl.
CPC ........... *H04H 20/71* (2013.01); *H04L 5/0055* (2013.01); *H04L 9/0861* (2013.01); *H04L 41/082* (2013.01); *H04L 41/14* (2013.01); *H04L 43/065* (2013.01); *H04L 43/0817* (2013.01); *H04L 43/0852* (2013.01); *H04L 43/0882* (2013.01); *H04L 43/10* (2013.01); *H04L 45/02* (2013.01); *H04L 47/115* (2013.01); *H04L 47/16* (2013.01); *H04L 49/1584* (2013.01); *H04L 63/061* (2013.01); *H04L 63/08* (2013.01); *H04L 63/0853* (2013.01); *H04L 67/30* (2013.01); *H04L 69/22* (2013.01); *H04W 4/008* (2013.01); *H04W 4/028* (2013.01); *H04W 4/06* (2013.01); *H04W 12/04* (2013.01); *H04W 12/06* (2013.01); *H04W 16/18* (2013.01); *H04W 24/06* (2013.01); *H04W 40/24* (2013.01); *H04W 52/0251* (2013.01); *H04W 52/38* (2013.01); *H04W 72/12* (2013.01); *H04W 76/021* (2013.01); *H04W 76/023* (2013.01); *H04W 84/18* (2013.01); *H04W 88/06* (2013.01); *Y02B 60/50* (2013.01)

(58) Field of Classification Search
USPC ........... 455/456.1, 456.3; 370/311, 328, 338
See application file for complete search history.

(56) References Cited

U.S. PATENT DOCUMENTS

| | | | |
|---|---|---|---|
| 7,522,540 | B1 | 4/2009 | Maufer |
| 7,778,270 | B1 | 8/2010 | Zhang et al. |
| 7,787,427 | B1 | 8/2010 | Simon et al. |
| 8,495,618 | B1 | 7/2013 | Inbaraj et al. |
| 8,516,269 | B1 | 8/2013 | Hamlet et al. |
| 8,681,671 | B1 | 3/2014 | Hui et al. |
| 8,938,792 | B2 | 1/2015 | Koeberl et al. |
| 8,953,790 | B2 | 2/2015 | Qi et al. |
| 2002/0119770 | A1 | 8/2002 | Twitchell |
| 2003/0037237 | A1 | 2/2003 | Baldwin et al. |
| 2003/0163554 | A1 | 8/2003 | Sendrowicz |
| 2003/0181203 | A1 | 9/2003 | Cheshire |
| 2005/0036469 | A1 | 2/2005 | Wentink |
| 2005/0113102 | A1 | 5/2005 | Kwon et al. |
| 2005/0175184 | A1 | 8/2005 | Grover et al. |
| 2005/0246533 | A1 | 11/2005 | Gentry |
| 2005/0249137 | A1 | 11/2005 | Todd et al. |
| 2006/0025180 | A1 | 2/2006 | Rajkotia et al. |
| 2006/0034233 | A1 | 2/2006 | Strutt et al. |
| 2006/0041653 | A1 | 2/2006 | Aaron |
| 2006/0135064 | A1 | 6/2006 | Cho et al. |
| 2006/0154598 | A1 | 7/2006 | Rudland et al. |
| 2006/0156390 | A1 | 7/2006 | Baugher |
| 2006/0209584 | A1 | 9/2006 | Devadas et al. |
| 2006/0212938 | A1 | 9/2006 | Suzuki |
| 2006/0245424 | A1 | 11/2006 | Ramanathan et al. |
| 2006/0268742 | A1 | 11/2006 | Chu et al. |
| 2006/0268749 | A1 | 11/2006 | Rahman et al. |
| 2007/0097895 | A1 | 5/2007 | Keshavarzian et al. |
| 2007/0105542 | A1 | 5/2007 | Friedman |
| 2007/0110024 | A1 | 5/2007 | Meier |
| 2007/0127421 | A1 | 6/2007 | D'Amico et al. |
| 2007/0206537 | A1 | 9/2007 | Cam-Winget et al. |
| 2007/0211654 | A1 | 9/2007 | Kim et al. |
| 2007/0211736 | A1 | 9/2007 | Sapek et al. |
| 2007/0247303 | A1 | 10/2007 | Payton |
| 2007/0280137 | A1 | 12/2007 | Bahr et al. |
| 2008/0013947 | A1 | 1/2008 | Peloso et al. |
| 2008/0095059 | A1 | 4/2008 | Chu et al. |
| 2008/0205385 | A1 | 8/2008 | Zeng et al. |
| 2008/0279155 | A1 | 11/2008 | Pratt, Jr. et al. |
| 2008/0291855 | A1 | 11/2008 | Bata et al. |
| 2008/0292105 | A1 | 11/2008 | Wan et al. |
| 2009/0067373 | A1 | 3/2009 | Kneckt et al. |
| 2009/0216349 | A1 | 8/2009 | Kwon et al. |
| 2009/0222659 | A1 | 9/2009 | Miyabayashi et al. |
| 2009/0232037 | A1 | 9/2009 | Dixit et al. |
| 2009/0274173 | A1 | 11/2009 | Wentink |
| 2010/0005294 | A1 | 1/2010 | Kostiainen et al. |
| 2010/0046439 | A1 | 2/2010 | Chen et al. |
| 2010/0100940 | A1 | 4/2010 | Reynolds |
| 2010/0141406 | A1 | 6/2010 | Jo et al. |
| 2010/0149028 | A1 | 6/2010 | Mermet et al. |
| 2010/0191968 | A1 | 7/2010 | Patil et al. |
| 2010/0202345 | A1 | 8/2010 | Jing et al. |
| 2010/0205281 | A1 | 8/2010 | Porter et al. |
| 2010/0241857 | A1 | 9/2010 | Okude et al. |
| 2010/0246460 | A1 | 9/2010 | Kholaif et al. |
| 2010/0260146 | A1 | 10/2010 | Lu |
| 2010/0262828 | A1 | 10/2010 | Brown et al. |
| 2011/0053493 | A1 | 3/2011 | Yanagihara |
| 2011/0081860 | A1 | 4/2011 | Brown et al. |
| 2011/0099368 | A1 | 4/2011 | Koh |
| 2011/0121654 | A1 | 5/2011 | Recker et al. |
| 2011/0128884 | A1 | 6/2011 | Reynaud et al. |
| 2011/0216695 | A1 | 9/2011 | Orth |
| 2012/0087290 | A1 | 4/2012 | Rhee et al. |
| 2012/0087292 | A1 | 4/2012 | Grimm et al. |
| 2012/0163292 | A1 | 6/2012 | Kneckt et al. |
| 2012/0195231 | A1 | 8/2012 | Fonseca et al. |
| 2012/0196534 | A1 | 8/2012 | Kasslin et al. |
| 2012/0198434 | A1 | 8/2012 | Dirstine et al. |
| 2012/0198435 | A1 | 8/2012 | Dirstine et al. |
| 2012/0252405 | A1 | 10/2012 | Lortz et al. |
| 2012/0263072 | A1 | 10/2012 | Wu |
| 2013/0016654 | A1 | 1/2013 | Mayo et al. |
| 2013/0029685 | A1 | 1/2013 | Moshfeghi |
| 2013/0051552 | A1 | 2/2013 | Handschuh et al. |
| 2013/0064175 | A1 | 3/2013 | Pandey et al. |
| 2013/0065584 | A1 | 3/2013 | Lyon et al. |
| 2013/0067222 | A1 | 3/2013 | Munger et al. |
| 2013/0070745 | A1 | 3/2013 | Nixon et al. |
| 2013/0080765 | A1 | 3/2013 | Mohanty et al. |
| 2013/0128809 | A1 | 5/2013 | Wentink et al. |
| 2013/0130622 | A1 | 5/2013 | Yang et al. |

(56) References Cited

U.S. PATENT DOCUMENTS

| | | |
|---|---|---|
| 2013/0198305 A1 | 8/2013 | Veillette |
| 2013/0215900 A1 | 8/2013 | Jogadhenu |
| 2013/0219482 A1 | 8/2013 | Brandt |
| 2013/0227336 A1 | 8/2013 | Agarwal et al. |
| 2013/0242929 A1 | 9/2013 | Goergen et al. |
| 2013/0279409 A1 | 10/2013 | Dublin, III et al. |
| 2013/0279410 A1 | 10/2013 | Dublin, III et al. |
| 2013/0301471 A1 | 11/2013 | Brown et al. |
| 2014/0025806 A1 | 1/2014 | Robitaille et al. |
| 2014/0044016 A1 | 2/2014 | Rahman |
| 2014/0047260 A1 | 2/2014 | Iijima et al. |
| 2014/0064261 A1 | 3/2014 | Wang et al. |
| 2014/0089912 A1 | 3/2014 | Wang et al. |
| 2014/0108786 A1 | 4/2014 | Kreft |
| 2014/0111234 A1 | 4/2014 | Laackmann et al. |
| 2014/0112470 A1 | 4/2014 | Shen et al. |
| 2014/0167912 A1 | 6/2014 | Snyder et al. |
| 2014/0169174 A1 | 6/2014 | Gilson |
| 2014/0189790 A1 | 7/2014 | Mindler et al. |
| 2014/0266669 A1 | 9/2014 | Fadell et al. |
| 2014/0337607 A1 | 11/2014 | Peterson et al. |
| 2015/0010153 A1 | 1/2015 | Robertson |
| 2015/0052351 A1 | 2/2015 | Nodehi et al. |
| 2015/0058409 A1 | 2/2015 | Wang |
| 2015/0143130 A1 | 5/2015 | Ducharme et al. |
| 2015/0195692 A1 | 7/2015 | Chow et al. |
| 2015/0242614 A1 | 8/2015 | Scagnol et al. |
| 2015/0244481 A1 | 8/2015 | Tyson et al. |
| 2015/0244484 A1 | 8/2015 | Tyson et al. |
| 2015/0244565 A1 | 8/2015 | Heydon et al. |
| 2015/0244623 A1 | 8/2015 | Heydon et al. |
| 2015/0244648 A1 | 8/2015 | Tyson et al. |
| 2015/0244828 A1 | 8/2015 | Heydon |
| 2015/0245182 A1 | 8/2015 | Scagnol et al. |
| 2015/0245203 A1 | 8/2015 | Tyson et al. |
| 2015/0245204 A1 | 8/2015 | Heydon |
| 2015/0245220 A1 | 8/2015 | Williamson et al. |
| 2015/0245231 A1 | 8/2015 | Jarvis et al. |
| 2015/0245296 A1 | 8/2015 | Tyson et al. |
| 2015/0245351 A1 | 8/2015 | Banerjea et al. |
| 2015/0245369 A1 | 8/2015 | Heydon |
| 2015/0245412 A1 | 8/2015 | Tyson et al. |
| 2015/0326444 A1 | 11/2015 | Smith et al. |

FOREIGN PATENT DOCUMENTS

| | | |
|---|---|---|
| EP | 1496668 A1 | 1/2005 |
| EP | 1780951 A2 | 5/2007 |
| EP | 1886450 B1 | 2/2008 |
| EP | 2306692 A1 | 4/2011 |
| GB | 2464125 A | 4/2010 |
| JP | 2007124148 A | 5/2007 |
| WO | 02078272 A1 | 10/2002 |
| WO | 03026224 A1 | 3/2003 |
| WO | 2004004230 A1 | 1/2004 |
| WO | WO-2004104850 A1 | 12/2004 |
| WO | 2007013914 A1 | 2/2007 |
| WO | 2008004102 A2 | 1/2008 |
| WO | 2008013878 A1 | 1/2008 |
| WO | 2009082151 A2 | 7/2009 |
| WO | 2009088887 A2 | 7/2009 |
| WO | 2010036885 A2 | 4/2010 |
| WO | 2010/089737 A1 | 8/2010 |
| WO | 2011043755 A1 | 4/2011 |
| WO | 2012064178 A1 | 5/2012 |
| WO | 2013010427 A | 1/2013 |
| WO | 2013028404 A1 | 2/2013 |
| WO | 2013057666 A1 | 4/2013 |
| WO | 2014/000163 A1 | 1/2014 |

OTHER PUBLICATIONS

Search Report for DE Application 10 2014 012 518.1 mailed on Feb. 27, 2015 (14 pages).

Search Report for DE Application 10 2014 012 615.3 mailed on Jan. 27, 2015 (6 pages).

Search Report for GB Application 1405790.5 mailed on Oct. 14, 2014 (5 pages).

Search Report for GB Application 1403312.0 mailed on Jun. 25, 2014 (3 pages).

Search Report for GB Application 1405786.3 mailed on Jul. 17, 2014 (3 pages).

Search Report for GB Application 1415178.1 mailed on Sep. 25, 2014 (5 pages).

Search Report for GB Application 1405797.0 mailed on Sep. 2, 2014 (3 pages).

Search Report for GB Application 1405789.7 mailed on Sep. 26, 2014 (4 pages).

Search Report for GB Application 1405797.0 mailed on Jul. 17, 2014 (4 pages).

Search Report for GB Application 1415177.3 mailed on Sep. 10, 2014 (4 pages).

Search Report for DE Application 10 2014 012 257.3 mailed on Jan. 27, 2015 (7 pages).

Search Report for DE Application 10 2014 012 616.1 mailed on Feb. 3, 2015 (6 pages).

Search Report for GB Application 1412715.3 mailed on Jan. 8, 2015 (3 pages).

Search Report for GB Application 1412722.9 mailed on Jan. 13, 2015 (6 pages).

Search Report for GB Application 1501943.3 mailed on Mar. 20, 2015 (4 pages).

Chiang et al., "Neighborhood-Aware Density Control in Wireless Sensor Networks," 2008 IEEE International Conferences on Sensor Networks, Ubiquitous, and Trustworthy Computing, 8 pages.

Balachandran et al., "Adaptive Sleeping and Awakening Protocol (ASAP) for Energy Efficient Adhoc Sensor Networks," 2005 IEEE, 7 pages.

Schutz K: "Trusted Platforms for Homeland Security", Atmel white paper, Copyright 2004, pp. 1-8, http://www.atmel.com/images/doc5062.pdf.

OBJECT TRACKING BY ESTABLISHING A MESH NETWORK AND TRANSMITTING PACKETS

CROSS REFERENCE TO RELATED APPLICATIONS

This non-provisional patent application claims priority to Great Britain applications: GB 1412717.9, filed Jul. 17, 2014; GB 1405790.5, filed Mar. 31, 2014; GB 1403314.6, filed Feb. 25, 2014; GB 1405785.5, filed Mar. 31, 2014; GB 1405786.3, filed Mar. 31, 2014; GB 1405789.7, filed Mar. 31, 2014; GB 1403312.0, filed Feb. 25, 2014; GB 1405791.3, filed Mar. 31, 2014; GB 1405797.0, filed Mar. 31, 2014.

TECHNICAL FIELD

This invention relates to an apparatus and method for assisting in the tracking of objects.

BACKGROUND

Objects of various types and sizes are increasingly transported from one location to another as goods are manufactured in one country but sold in another and as the popularity of internet shopping increases the quantity of goods that are delivered to customers' homes rather than being purchased in store. Increasing quantities of goods are also being held in large storage facilities for subsequent distribution. These trends create distribution challenges in ensuring that all goods get to the correct destination. The possibility that goods might go missing, either accidentally or due to theft, also needs to be addressed.

SUMMARY OF THE INVENTION

According to a first embodiment, there is provided a communication device configured to form a cluster with one or more other communication devices in its vicinity, monitor the presence, in the cluster, of those other communication devices and provide information about the presence, in the cluster, of the other communication devices to another device.

The communication device may be configured to form the cluster by establishing a mesh network with one or more of the other communication devices.

The communication device may be configured to consider, as part of the cluster, communication devices that are not configured to communicate via the mesh network.

The communication device may be configured to transmit an alert to the other device when a communication device joins or leaves the cluster.

The communication device may be configured to monitor the presence, in the cluster, of the other communication devices by transmitting query messages to other communication devices and monitoring any responses.

The communication device may be configured to determine that a communication device has left the cluster if it does not receive a response from that communication device to the query message.

The communication device may be configured to receive periodic presence updates from the other communication devices in the cluster and to determine that a communication device has left the cluster if it does not receive a presence update from that communication device.

The communication device may be configured to establish an identity associated with a communication device in the cluster and include that identity with information provided to the other device about the presence of that communication device in the cluster.

The communication device may be configured to receive, from another communication device in the cluster, information relevant to a condition of the cluster and provide that information to the other device.

The communication device may be configured to provide that information to the other device as being relevant to the cluster as a whole.

The communication device may be configured to obtain different types of information from different ones of the other communication devices.

According to a second embodiment, there is provided a communication device configured to form a cluster with other communication devices in its vicinity and provide information about its presence in the cluster to another device, which is not part of the cluster.

The communication device may be configured to transmit an alert to the other device when it joins or leaves the cluster.

The communication device may be configured to, on leaving the cluster, join a new cluster with communication devices in its vicinity.

The communication device may be configured to use a different network key to communicate with different clusters and to select a network key for communicating with other communication devices in dependence on its location.

The communication device may be configured to determine its location and provide information about its location to the other device.

The communication device may be configured to provide information to the other device via a different communications protocol from that which governs communication between the communication devices in the cluster.

According to a third embodiment there is provided a method for tracking one or more objects comprising providing each object with a communication device, each communication device being configured to form a cluster with other communication devices in its vicinity and one or more of the communication devices providing information about a presence of a communication device in the cluster to another device, which is outside of the cluster.

The method may comprise a communication device that is leaving or joining the cluster providing information about its presence in the cluster to the other device.

The method may comprise a communication device in the cluster providing information about another communication device leaving or joining the cluster to the other device.

The method may comprise establishing a network between communication devices comprised in different clusters.

The method may comprise determining the status of one or more clusters from a device outside the cluster(s).

A remote device may be part of the network established between the communication devices in different clusters.

The method may comprise determining the status of the cluster(s) from a device implemented in the cloud.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
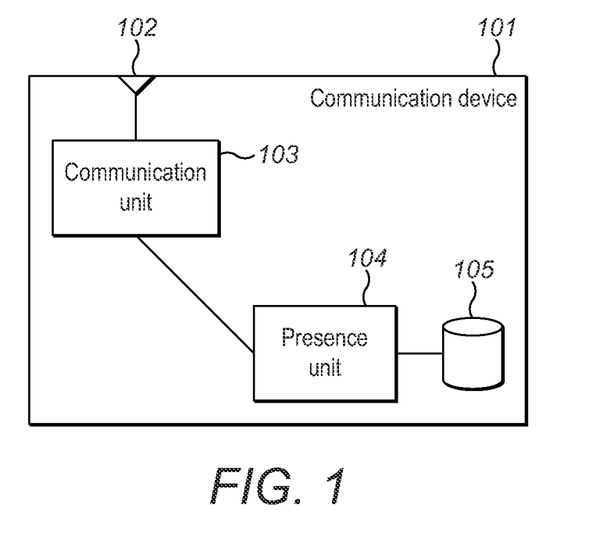
FIG. 1 shows an example of a communication device.

FIG. 1 illustrates an example of a communication device. The communication device 101 comprises an input/output 102, a communication unit 103, a presence unit 104 and a memory 105. Input/output 102 may be configured for wireless communication with other communication devices, although wired communication is also possible. Communication unit 103 is configured to handle communications with other communication devices via input/output 102. These communications may typically not be directed to any particular device, instead they may often take the form of "unselective" transmissions or broadcasts. Communication unit 103 enables communication device 101 to form part of an informal "cluster" of communication devices that are in physical proximity to each other. Communication unit 103 is able to detect the presence of other communication devices in the cluster via the communications it receives, and other communication devices are similarly able to detect the presence of communication device 101.

Presence unit 104 is configured to use information collected by communication unit 103 to monitor the physical presence of other communication devices in the cluster. This information may include presence information that has been deduced by the communication device itself and/or information that has been deduced by other communication devices in the cluster and passed to communication device 101 to form a collection of presence information relevant to the cluster. The presence unit may be configured to infer from information received by the communication unit that a device has joined the cluster, is part of the cluster and/or has left the cluster. Thus in monitoring the "presence" of a communication device in the cluster, the presence unit is able to monitor not only whether that device is part of the cluster but also whether it is not part of the cluster. The presence unit may optionally be configured to save information about the presence of other communication devices in the cluster in memory 105, which may, for example, be helpful to assist in determining that a device that was previously in the cluster has left it.

Finally the communication unit 103 may be configured to provide information from presence unit 104 to another device via input/output unit 102. This other device may be, for example, a "tracking server" for monitoring the condition of the cluster as a whole, a communication device with longer-range communication capabilities than communication device 101 (e.g. for transferring presence information to a remote tracking server) or a device that is capable of creating some audible or visible alert (e.g. to alert an operator to a communication device that has gone missing from the cluster). The other device may or may not be part of the cluster.

Figure 2:
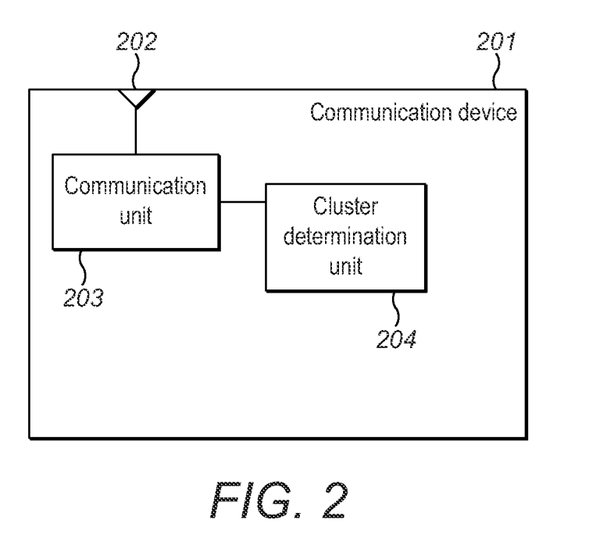
FIG. 2 shows an example of a communication device.

Another example of a communication device is shown in FIG. 2. In this example, the communication device is configured to return information about its own presence in a cluster to a tracking server. The communication device shown at 201 comprises an input/output 202, a communication unit 203 and a cluster determination unit 204. As with the communication unit in FIG. 1, communication unit 203 is configured to form a cluster with other communication devices in its vicinity via input/output 202. The cluster determination unit is configured to monitor which cluster the communication device is currently part of so that it is able to determine when the device moves from one cluster to another. It may make this determination, for example, based on some kind of identifier incorporated into packets it receives from other devices in the cluster, based on a network key used to encrypt packets it receives from other devices in the cluster and/or based on an identity of a central node in the cluster. If the communication device leaves one cluster, the communication unit may transmit a notification of this to another device, which may be outside of the cluster. If the communication device joins a new cluster, the communication unit may also transmit a notification of this to the other device. The communication unit may also be configured to, having left one cluster, establish a new cluster or join another existing cluster.

The structures shown in FIGS. 1 and 2 (and indeed all block apparatus diagrams included herein) are intended to correspond to a number of functional blocks in an apparatus. This is for illustrative purposes only. FIGS. 1 and 2 are not intended to define a strict division between different parts of hardware on a chip or between different programs, procedures or functions in software. In some embodiments, some or all of the algorithms described herein may be performed wholly or partly in hardware. In many implementations, at least part of the presence unit, the cluster determination unit and the communication unit may be implemented by a processor acting under software control (e.g. the CPU of a communication device). Any such software may be stored on a non-transient computer readable medium, such as a memory (RAM, cache, hard disk etc) or other storage means (USB stick, CD, disk etc).

It is envisaged that a cluster may typically be confined within a relatively small geographical area. A cluster is suitably a collection of one or more communication devices within geographical proximity of each other. Each communication device is suitably associated with some kind of object whose location and/or presence within the cluster is to be tracked. The communication devices within a cluster are capable of interacting with each other such that they can be identified as being part of the cluster. Some communication devices may know that they are part of the cluster; other devices may be unaware, and may be reliant on another communication device identifying that they are part of the cluster and reporting this to a tracking server.

A communication device may typically be in the vicinity of another if the two devices are within a RF propagation limits of each other. Thus multiple communication devices may be within the vicinity of one particular device if they are located within a certain range of that device. For example, a first communication device might be considered to be in the vicinity of a second communication device if it is located within 100 m or less of the second device, in some embodiments 50 m or less, in other embodiments 25 m or less, and in yet other embodiments 5 m or less. In various embodiments the communication device may be configured for relatively short-range wireless communication with other communication devices. In this situation a first communication device may be in the vicinity of a second communication device if the two are within radio range of each other. The exact range may depend on the capabilities of the respective communication device's radio transceivers but are suitably consistent with the ranges given above.

Figure 3:
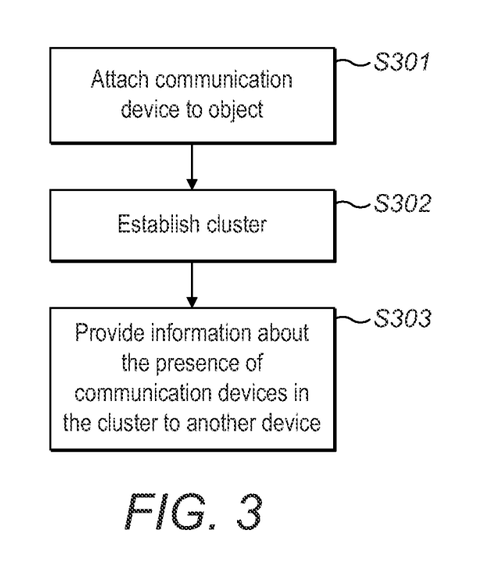
FIG. 3 shows a method for tracking objects.

An example of a method that may be used to track objects is shown in FIG. 3. The objects might be any object whose location is to be tracked or which forms part of a stock or inventory to be monitored. The objects might include packages or parcels, goods, freight etc. The method commences in step S301 with a communication device being attached to each object to be tracked. The communication devices may take the form of "tags". Communication devices in proximity to each other establish a cluster (step S302). Each cluster may, for example, take the form of an ad hoc mesh network. Each cluster may be identified in some way, e.g. by a network key or the identity of a "central node". Finally one or more of the communication devices provides information about the presence of communication devices in the cluster to another device (such as a tracking server, a communication device with longer-range communication capabilities, or a device capable of creating some audio or visual alert, etc.) (step S303). This may include a communication device providing information about its own presence in the cluster, e.g. by alerting the tracking server when it joins or leaves a particular cluster, or it may include a communication device acting as a central node by collecting information about the presence of other devices in the cluster and feeding this information back to the tracking server. The tracking server might be configured to perform an inventory and/or tracking function from a location that is remote from the cluster.

A communication device may be part of more than one cluster. An example of a situation when this might be possible is if communication devices that are part of the cluster are differentiated from those that are not by a factor that is independent of location, such as a network key or similar. It may leave one cluster and join or form another cluster. A communication device is likely to change clusters because the object it is attached to moves. The server may be alerted when a communication device leaves one cluster and joins another so that it can track objects across different clusters. Some communication devices may themselves be capable of communicating with the server; others may rely on a central node to report for them.

Figure 4A:
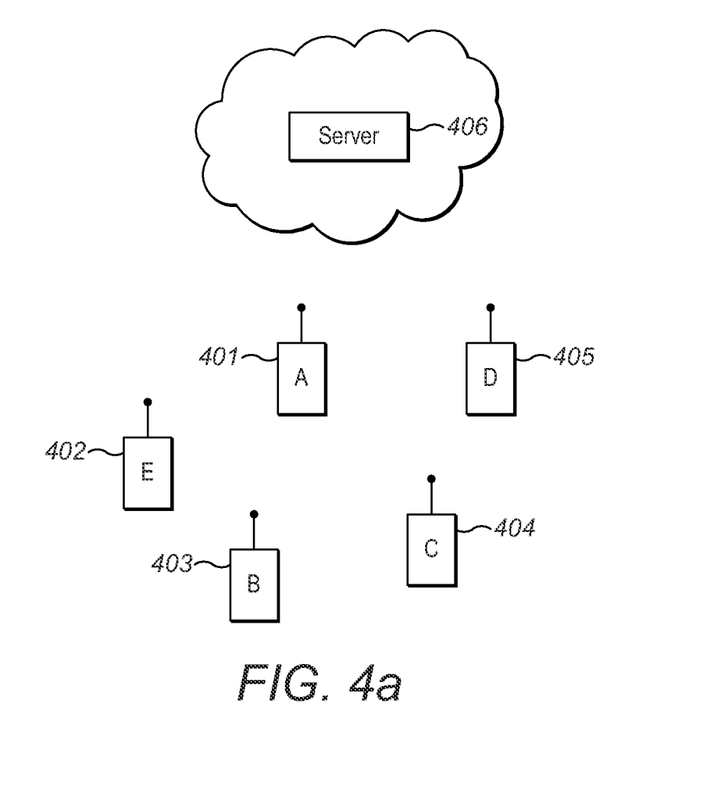
FIGS. 4a-4c show an example of a cluster.
Figure 4B:
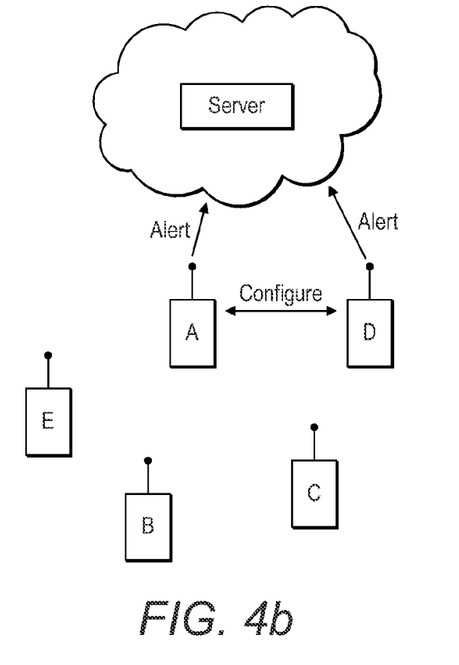
Figure 4C:
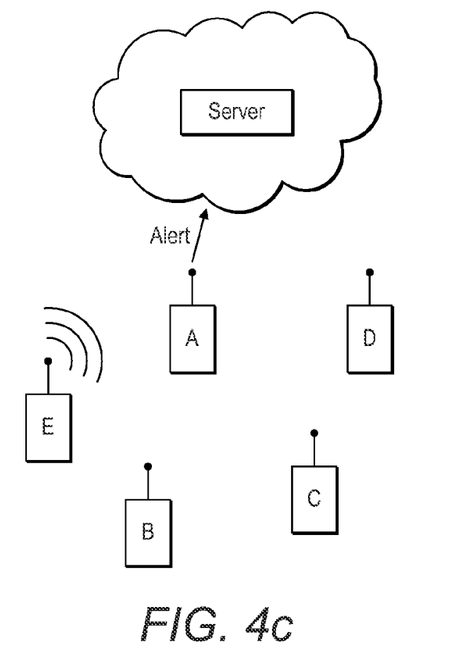

An example of a cluster is shown in FIGS. 4a to 4c. The cluster shown in FIG. 4a comprises communication devices A to E (401 to 405). Communication device A is a "central node": it is responsible for monitoring the presence of other devices in the cluster. Every cluster may have at least one central node. The other devices are "cluster nodes": at present they are part of the cluster but this might change. The communication devices are capable of communicating with each other via a wireless communication protocol, such as a short-range wireless communication protocol like Bluetooth, Bluetooth Low Energy, IEEE 803.11, etc. Suitably at least some of the communication devices are capable of forming an ad hoc mesh. The cluster may also include communication devices that are incapable of forming part of a mesh network. For example, communication device E may be capable of only a very basic form of wireless communication such as Radio-Frequency Identification (RFID).

Communication devices A and D may be able to communicate with server 406. The server is not part of the cluster and may usually be physically remote from it. In this example the server is implemented as part of the cloud. Communication devices A and D may communicate with the server via a wired or wireless connection. Suitably communication with the server is via a different communications protocol from communication over the cluster. For example, communication devices A and D may be configured to communicate with the server via 3G, LTE etc.

In FIG. 4b communication device D has just joined the cluster. Since communication device D is capable of communicating with the server, it alerts the server to its physical presence in the cluster. Since communication device A is the central node in this example, it also alerts the server to the presence of communication device D. In this example communication device A knows that communication device D has joined the cluster because it configured communication device D to join the cluster. Some communication devices may be unaware that they are part of the cluster, however. An example is communication device E, which may indicate its presence to communication device A by periodically transmitting an RFID signal, as shown in FIG. 4c.

In FIG. 4b the central node, represented by communication device A, discovers the physical presence of communication device D in the cluster from an unsolicited communication received from device D. A central node might also be configured to actively monitor the physical presence of other communication devices in the cluster. For example, it might be configured to periodically send out a request packet. Any communication device receiving the request packet should respond to the central node, thus confirming their physical presence in the cluster. The request packets could be addressed to individual devices but that risks missing devices that have recently moved into the vicinity of the central node that the central node is unaware of. The requests may therefore be formed as broadcast packets, which are not addressed to any particular device. Another option is for communication devices in a cluster to communicate their presence in the cluster to the central node periodically. The central node might also receive presence information indirectly via a cluster node reporting information about its neighbours to the central node. The central node may collect all the information it receives together to provide a report to the server.

The central node may only provide the server with information about devices of a particular type or with an identifier from a particular subset, to avoid confusing the server with reports of devices that might be within the geographical area covered by the cluster but which the sever is not interested in tracking.

A central node may provide regular reports to the server about the state of the cluster. A central node may alternatively, or in addition, be configured to transmit alerts to the server whenever a communication device leaves or joins the cluster.

A central node may also comprise a location unit that is capable of determining an absolute position of the device, e.g. via GNSS. The cluster may consist of communication devices that are all within physical proximity of each other so that the location of the central node approximates the location of the cluster as a whole. Thus by reporting its location back to the server, a central node may enable the server to track the location of the cluster as a whole.

A central node may monitor just the number of devices in the cluster and report this back to the server. It may also determine an identifier associated with each device of the cluster and report this to the server so that the server is able to track not only the number of devices in the cluster, but also their identities.

A central node may also be configured to provide the server with information from which a topology of the network might be deduced. For example, time-of-flight data or information concerning the route or number of hops a packet took to reach the central node from a cluster node etc. might be included in a report sent to the server.

Some communication devices may be configured to provide the server (either directly or via a central node) with information pertinent to the object to which they are attached and the environment in which they are located. For example, the communication device might be provided with a temperature sensor (e.g. to detect when the object is at risk of overheating), a G-sensor (e.g. to detect if the object has been dropped), or a light sensor (e.g. to detect whether a package has been opened). The communication device may determine which of this information to share and which to keep private to that device. Information gathered by communication devices that have these additional capabilities could be combined and treated as being applicable to all the cluster nodes in the cluster where that information was sampled. The process of gathering this information might also be collaborative, e.g. one node in a cluster might gather G-force information, another node in the same cluster might gather ambient temperature information etc. These roles might be assigned by the central node selecting which cluster node to query for particular information. Alternatively these roles may be determined by the fundamental capabilities of the cluster nodes, i.e. in dependence on which cluster node includes which type of sensor.

Any suitable mechanism might be employed to form the cluster. One particular example that provides the degree of flexibility required is to base the clusters on an ad hoc mesh network. In FIGS. 4a to 4c, communication devices A and D may be capable of acting as "configuring" devices and self-forming a mesh network. This capability may be shared by other mesh devices and not just those with the capability to communicate with a tracking server.

A mesh network may be established using a Mesh Association Protocol (MASP), which enables new devices to be configured to part of a mesh network. The MASP may involve authentication of new devices and secure distribution of one or more network keys. For example, devices that are not associated with the mesh can announce themselves using a well-known MASP network key. These messages might include a unique identifier for the device. Devices may have not only a unique identifier but also a secret authorization value to add an additional layer of authentication to the association process. Suitably that authorization value is distributed to another, "configuring" communication device using an out of band mechanism. Examples of out of band mechanisms include QR-Codes, ShortText strings, NFC tags, email, web-site pages, etc. Both devices may share a public key and challenge each other for knowledge of the authorization code, thus establishing a relationship of trust between the two communication devices. The configuring device then passes the network key to the new device. The network key may be used to sign all packets transmitted over the mesh network. A communication device may therefore be configured to use different network keys depending on its location, as their location may determine the mesh networks that they are part of.

As mentioned above, a communication device need not be capable of communicating via a mesh to form part of a cluster. Similarly mesh devices need not be part of the same mesh network to form part of the cluster. For example, some mesh devices may have a mode of operation in which they act as "promiscuous nodes". A mesh device operating in such a mode may forward all mesh packets, regardless of whether the network key is known to it or not. Thus a cluster could include mesh devices acting as promiscuous nodes, replying and forwarding mesh packets even though they are not actually part of the mesh network itself. A central node may restrict the number of times its packets can be retransmitted to avoid receiving replies from promiscuous nodes that are actually outside the cluster (described in more detail below).

Some mesh networks may use flood routing to transport packets through the network. In this method messages do not travel from one device to another via a predefined route. Instead messages are broadcast and any device in range that receives a message retransmits it. A message thus propagates its way through the network, potentially reaching its destination via a number of different routes. In order to avoid packets being bounced around the network indefinitely, each packet suitably includes a lifetime field that defines the lifetime of the packet within the network. A communication device that receives the packet suitably checks whether the lifetime field is equal to a threshold value before retransmitting the packet. If the lifetime value is equal to the threshold, the communication device does not retransmit the packet. Otherwise the communication device does retransmit the packet. In one example the lifetime field is a Time-To-Live (TTL) field. This is a value in the packet that is suitably decremented each time that the packet is retransmitted. In one example the TTL value is decremented by one at each retransmission, with each communication device that receives the packets retransmitting it until the TTL value is decremented to zero. In another example the lifetime field is a Max Hop Count (MHC) field. In this example each communication device stores a threshold MHC value, which is a positive, non-zero number. The MHC value in each packet may be incremented by one each time that the packet is retransmitted, with each communication device that receives the packets retransmitting it until the MHC value reaches the device's stored MHC threshold.

An advantage of having mesh devices retransmit packets that are not addressed to them (such as in flood routing) is that it enables a mesh network to cover a larger geographical area than could be achieved using the radio range of a single communication device on its own. Flood routing, however, means that a central node might end up receiving replies from devices that are actually not in the cluster. For example, a communication device outside the cluster might be relayed a request from the central node by a cluster node on the edge of the cluster. The communication device might respond to that request via the cluster node, either because it was previously part of the cluster and knows the network key or because it is a promiscuous node. Therefore, in order to restrict the geographical area of the cluster (e.g. so that a central node's location can be taken to approximate the location of the cluster as whole), the central node may restrict a TTL or MHC field to a value that can result in it receiving replies from devices in its vicinity. The central node may, for example, only be interested in devices that are one or two hops away. Another option would be to restrict the communication devices to only responding to requests that originate from one particular cluster. These requests might be identified via a network key or by including an identifier of the central node in the request.

Figure 5:
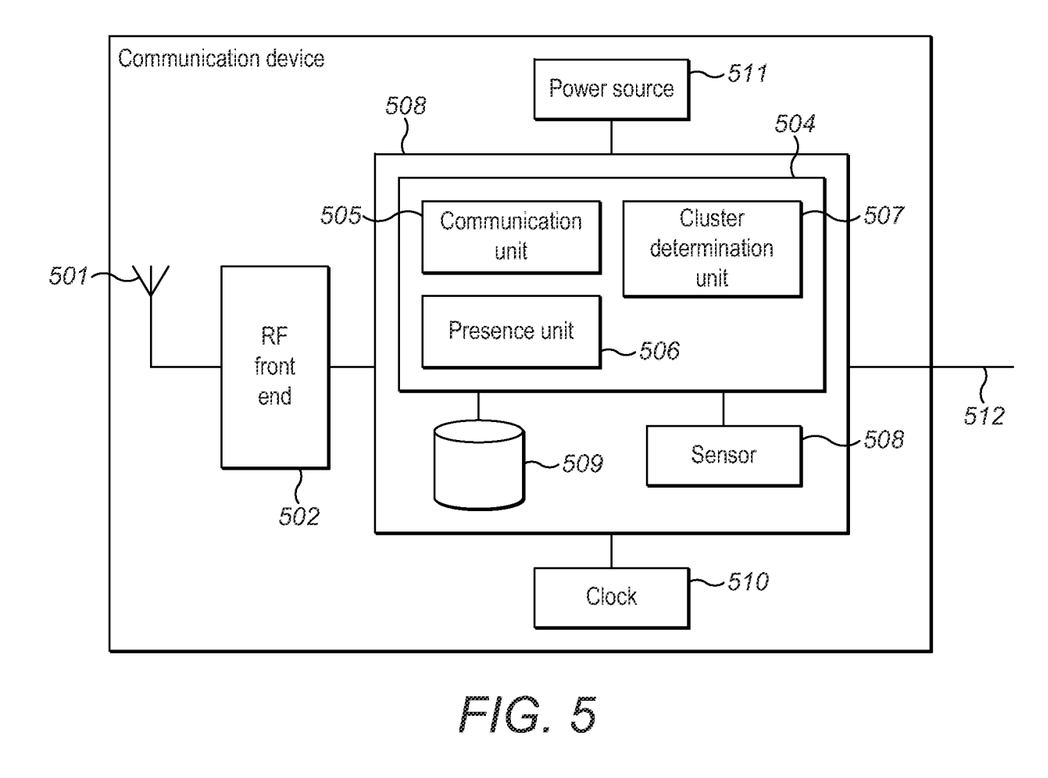
FIG. 5 shows an example of a communication device.

Another example of a communication device is shown in FIG. 5. In this example the communication device is specifically configured for wireless communication. The device of FIG. 5 comprises an antenna 501, a radio frequency front end 502 and a baseband processor 508. The baseband processor comprises a microprocessor 504 and a non-volatile memory 509. The non-volatile memory 509 stores in non-transitory form program code that is executable by the microprocessor to cause the baseband processor to implement the communication protocol of the network. In this example the non-volatile memory 509 stores in non-transitory form program code that is executable by the microprocessor to optionally implement one or more of the communication unit 505, the presence unit 506, and the cluster determination unit 507.

The device optionally comprises a sensor 508 for sensing information about its external environment. The device also comprises a clock 510, which can be turned on or off by the microprocessor 504 in order to save power, and an optional external wired connection 512 for exchanging information with the device's associated object (depending on that object's capabilities). Information detected by sensor 508 might also cause power to be turned on, off or restricted. The device also comprises a power source 511, which may be a battery. The device may also be mains-powered.

The RF front end 502 and the baseband processor could be implemented on one or more integrated circuits.

Figure 6A:
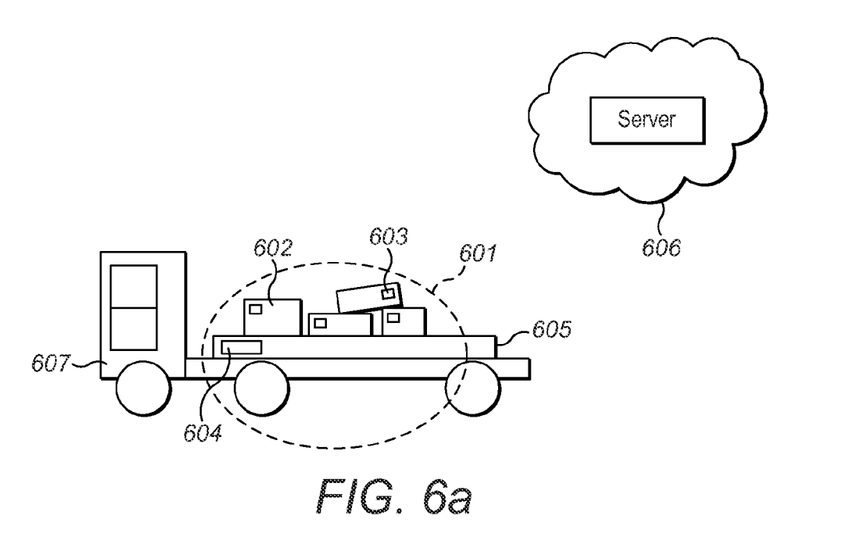
FIG. 6a-6d show a practical example of multiple clusters.
Figure 6B:
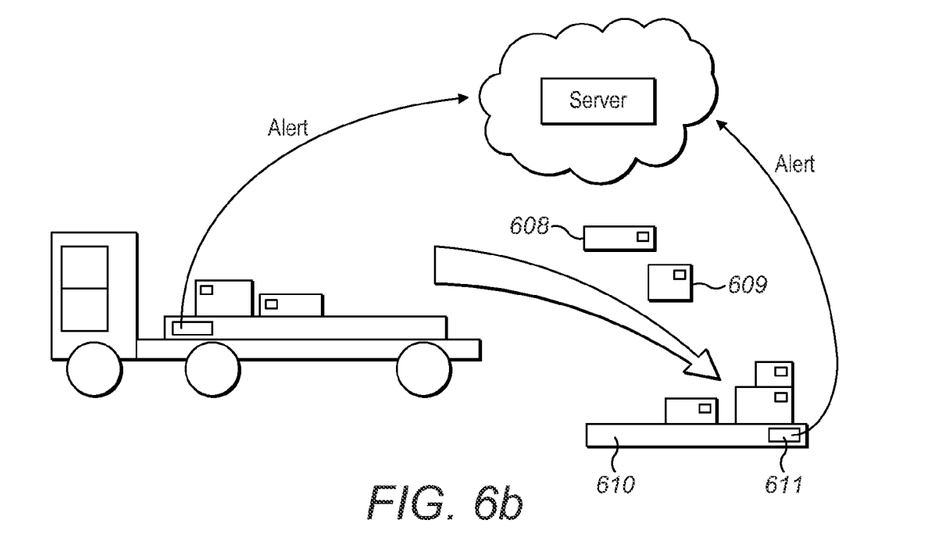
Figure 6C:
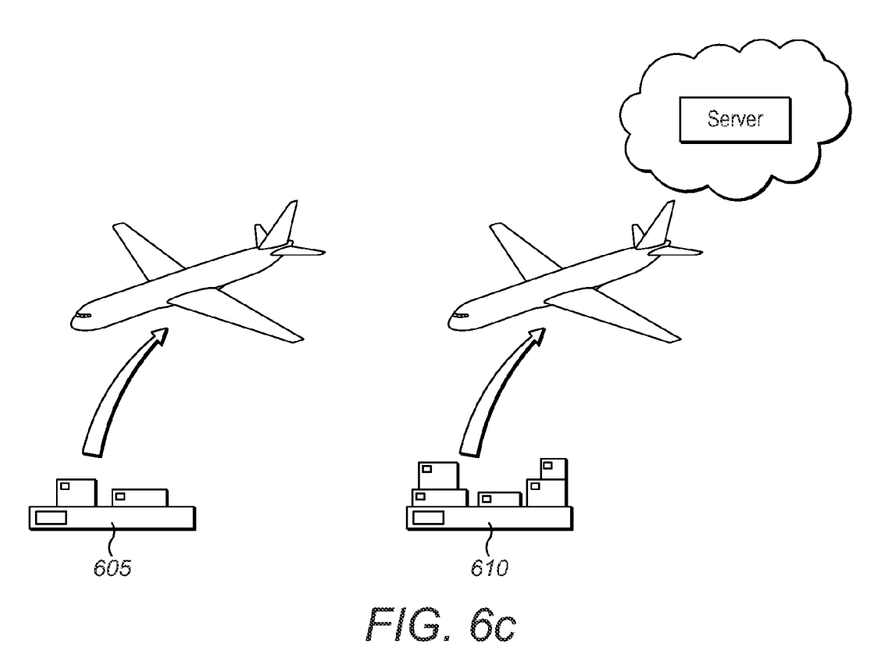
Figure 6D:
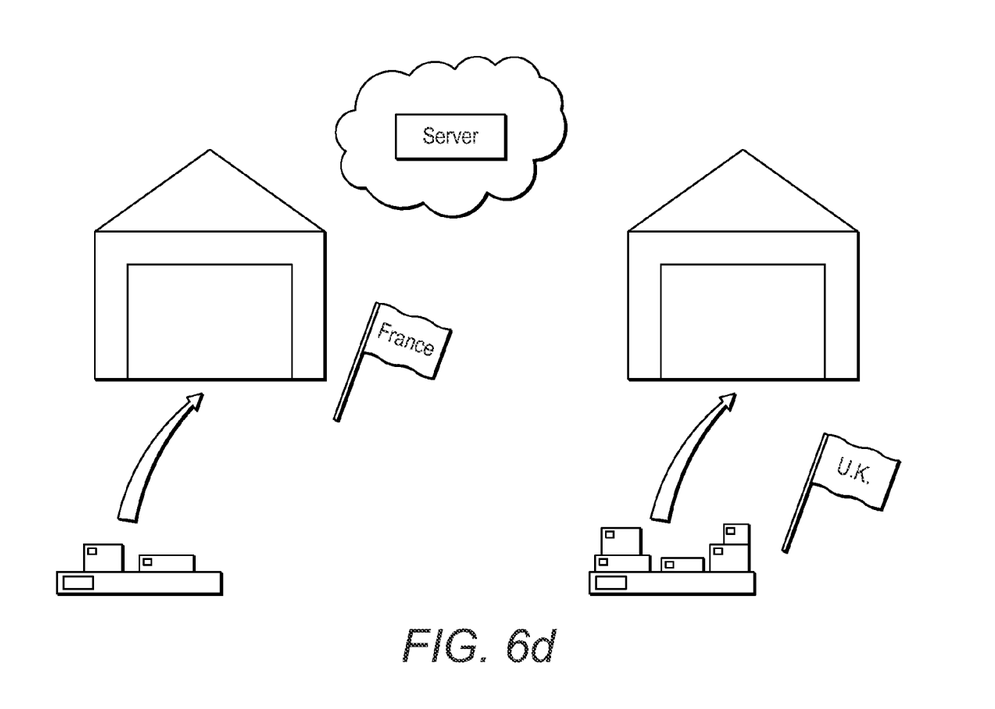

An example of how the communication devices described herein might be used in practice is shown in FIGS. 6a to 6d. In this example the communication devices are used to track packages. They are termed "package tags". FIG. 6a illustrates a first cluster 601 which comprises packages 602 that each have a package tag 603. The cluster also includes a so-called "central tag" 604. The central tag may be attached to a packet or it may be attached to a larger object such as a pallet 605 that contains the packages of cluster 601. Central tag 604 comprises a means for determining its location, such as a GNSS receiver. It regularly reports its location back to server 606 enabling the server to track the packages in the cluster as truck 607 transports them to an airport. The central tag also reports back to the server on the physical presence of the other package tags in the cluster so the server is also able to track that all of the packages reach the airport. When the truck reaches the airport (FIG. 6b), packages 608 and 609 are removed from pallet 605 and placed on pallet 610. Central tag 604 alerts the server that packages 608 and 609 have left its cluster. Similarly central tag 611 alerts the server that packages 608 and 609 have joined its cluster. Pallets 605 and 610 are then placed on separate aircraft (FIG. 6c). Depending on the communication capabilities of central tags 604 and 611 it may be possible to track the respective clusters during flight. When pallets 605 and 610 reach their destinations, server 606 is able to confirm that they have reached the appropriate warehouses, which in this example are in different countries (FIG. 6d).

One advantage of the arrangement shown in FIGS. 6a to 6d is that it enables a remote device (and thus a remotely located user) to track the location of packages as they are transported. It also enables the remote device to be notified if any of those packages go missing en route. Another advantage is that this tracking and monitoring is achieved without losing flexibility: the ad hoc nature of the clusters means that a package can leave one cluster and join another. Thus packages in a cluster are not required to stay in that cluster, and thus they can start in one cluster and yet be intended for different destinations.

Figure 7:
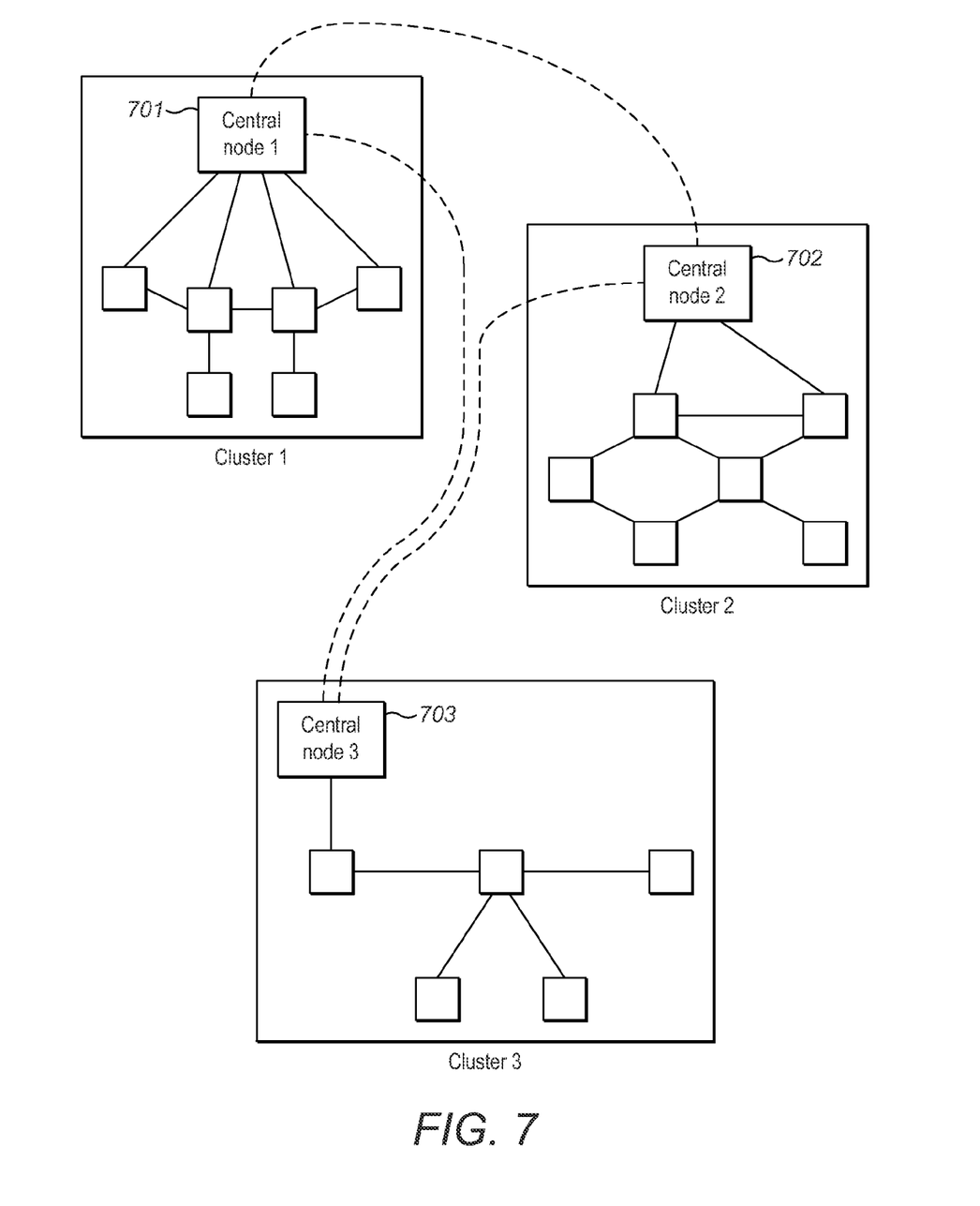
FIG. 7 shows an example of a group of central nodes communicating together.

It is also possible for central nodes to share information via a network. An example of this is shown in FIG. 7, in which central nodes 701 to 703 are joined by a mesh network. If the mesh follows the MASP described above, the association of the central nodes into a mesh may not happen automatically due to the requirement for out-of-band communication of authorisation codes. If, however, the central nodes of each cluster have access to the relevant authorisation codes, they are able to then form a mesh using MASP. The central nodes may share information and also transfer information back to a tracking server (not shown in FIG. 7). The tracking server may also organise communications across the mesh network by the control nodes, e.g. by acting as a mediator.

The tracking server may be implemented as a processor configured by software to monitor the status of one or more clusters. That software may be stored in non-transient form. The tracking server may be configured to collect information from nodes in one or more clusters and collate that information together to obtain an overall picture of the cluster(s). The tracking server is thus has an overview of the status of an individual cluster and the nodes it contains together with an overview of the clusters as a group. As mentioned above, the tracking server may be implemented as part of the cloud and thus in some embodiments it may be implemented by a number of different processors interacting together to run the required routines and algorithms. In some examples a human operator may be able to access the tracking server via a client interface.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A communication device comprising:
   one or more processors; and
   a memory storing instructions that, when executed by the one or more processors, causes the communication device to:
   form a cluster with other communication devices based on a proximity of the other communication devices to the communication device;
   establish a mesh network with at least one of the other communication devices;
   monitor a presence, in the cluster, of the other communication devices based at least in part on communications received via the mesh network; and
   communicate information about the presence, in the cluster, of the other communication devices to a remote device that is not part of the cluster.

2. The communication device of claim 1, wherein the other communication devices include at least one device that is not configured to communicate via the mesh network.

3. The communication device of claim 1, wherein execution of the instructions to monitor the presence of the other communication devices causes the communication device to:
   transmit query messages to the other communication devices; and listen for responses from the other communication devices.

4. The communication device of claim 1, wherein execution of the instructions to monitor the presence of the other communication devices causes the communication device to:
   receive periodic presence updates from the other communication devices; and
   determine that a particular communication device has left the cluster if no presence update is received from the particular communication device.

5. The communication device of claim 1, wherein execution of the instructions further causes the communication device to:
   configure an identity associated with one or more of the other communication devices; and
   communicate the identity to the remote device.

6. The communication device of claim 1, wherein execution of the instructions further causes the communication device to:
   receive, from one or more of the other communication devices in the cluster, information relevant to a condition of the cluster; and
   communicate the information to the remote device.

7. The communication device of claim 6, wherein the information is relevant to the cluster as a whole.

8. The communication device of claim 6, wherein the information includes different types of information from different ones of the other communication devices.

9. A communication device comprising:
   one or more processors; and
   a memory storing instructions that, when executed by the one or more processors, causes the communication device to:
      monitor a presence of the communication device in a cluster with other communication devices based at least in part on communications received via a mesh network formed with at least one of the other communication devices; and
      communicate information about the presence of the communication device in the cluster to a remote device that is not part of the cluster.

10. The communication device of claim 9, wherein execution of the instructions to communicate information about the presence of the communication device further causes the communication device to:
    transmit an alert to the remote device when the communication device joins or leaves the cluster.

11. The communication device of claim 9, wherein execution of the instructions further causes the communication device to:
    identify the cluster based at least in part on communications received via the mesh network; and
    select a network key to be used for communicating with the other communication devices based on the identified cluster.

12. The communication device of claim 9, wherein execution of the instructions further causes the communication device to:
    determine a location of the communication device; and
    communicate information about the location to the remote device.

13. The communication device of claim 9, wherein the communication device uses a different communications protocol to communicate with the remote device than with the other communication devices in the cluster.

14. A method for tracking a plurality of communication devices, the method being performed by a first communication device of the plurality of communication devices and comprising:
    forming a cluster with others of the plurality of communication devices in its vicinity by based at least in part on a proximity of the other communication devices to the first communication device;
    establishing a mesh network with at least one of the other communication devices;
    monitoring a presence, in the cluster, of the other communication devices based at least in part on communications received via the mesh network; and
    communicating information about the presence of the other communication devices in the cluster to a remote device that is not part of the cluster.

15. The method of claim 14, wherein the information about the presence of the other communication devices includes a notification that a particular communication device is leaving or joining the cluster.

16. The method of claim 14, further comprising:
    communicating information about the first communication device leaving or joining the cluster.

17. The method of claim 14, further comprising:
    establishing a network with communication devices belonging to one or more other clusters.

18. The method of claim 17, further comprising:
    determining a status of the one or more other clusters from the remote device.

19. The method of claim 18, wherein the remote device forms part of the network with the communication devices belonging to the one or more other clusters.

* * * * *